United States Patent
Kim

(10) Patent No.: US 10,885,387 B1
(45) Date of Patent: Jan. 5, 2021

(54) METHODS FOR TRAINING AUTO-LABELING DEVICE AND PERFORMING AUTO-LABELING BY USING HYBRID CLASSIFICATION AND DEVICES USING THE SAME

(71) Applicant: Superb AI Co., Ltd., Seoul (KR)

(72) Inventor: Kye-Hyeon Kim, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 16/984,643

(22) Filed: Aug. 4, 2020

(51) Int. Cl.
G06K 9/62 (2006.01)
G06K 9/46 (2006.01)
G06N 20/00 (2019.01)

(52) U.S. Cl.
CPC ............. G06K 9/6256 (2013.01); G06K 9/46 (2013.01); G06K 9/628 (2013.01); G06K 9/6263 (2013.01); G06N 20/00 (2019.01)

(58) Field of Classification Search
CPC .. G06K 9/6259; G06K 9/6232; G06K 9/6267; G06T 7/70; G06T 11/00; G06T 2207/20081; G06T 2210/12; G06N 3/04; G06N 3/08
See application file for complete search history.

(56) References Cited

U.S. PATENT DOCUMENTS

| | | | |
|---|---|---|---|
| 10,304,193 B1* | 5/2019 | Wang ................... | G06T 7/0012 |
| 10,733,431 B2* | 8/2020 | Zhang ................ | G06K 9/00369 |
| 2017/0083792 A1* | 3/2017 | Rodriguez-Serrano ..................... | G06T 7/10 |
| 2018/0150684 A1* | 5/2018 | Wang .................... | G06K 9/6256 |
| 2018/0373963 A1* | 12/2018 | Lo ............................ | G06N 3/08 |
| 2019/0108396 A1* | 4/2019 | Dal Mutto .............. | G06T 7/174 |
| 2019/0113917 A1* | 4/2019 | Buch ..................... | G06N 3/0454 |
| 2019/0228236 A1* | 7/2019 | Schlicht ................ | B60R 16/023 |
| 2019/0251694 A1* | 8/2019 | Han ....................... | G06T 3/0068 |
| 2019/0259474 A1* | 8/2019 | Wang ..................... | G16C 20/50 |
| 2019/0384303 A1* | 12/2019 | Muller ............... | G06K 9/00791 |
| 2020/0097820 A1* | 3/2020 | Song ........................ | G06N 3/08 |
| 2020/0134362 A1* | 4/2020 | Luo ....................... | G06K 9/6256 |
| 2020/0151489 A1* | 5/2020 | Sriram .................... | G06N 3/08 |
| 2020/0242451 A1* | 7/2020 | Cao ....................... | G06N 3/0481 |
| 2020/0272902 A1* | 8/2020 | Feng ........................ | G06K 9/00 |
| 2020/0285916 A1* | 9/2020 | Wang ..................... | G06N 3/084 |

* cited by examiner

*Primary Examiner* — Utpal D Shah
(74) *Attorney, Agent, or Firm* — Greenberg Traurig LLP; Barry Schindler; Lennie Bersh

(57) ABSTRACT

A method for training an auto-labeling device is provided. The method includes: (a) inputting a training image to a feature extraction module to generate a feature, (b) inputting the feature to a fitness estimation module to output a fitness value, inputting the feature to a first classification module to output a first class score and a first uncertainty score, inputting the feature to a second classification module to output a second class score and a second uncertainty score, and then generating a scaled second uncertainty score; and (c) (i) training the first classification module and the feature extraction module by referring to the first class score, (ii) training the second classification module and the feature extraction module by referring to the second class score, (iii) updating a scale parameter by referring to the first uncertainty score and the scaled second uncertainty score, and (iv) training the fitness estimation module.

18 Claims, 8 Drawing Sheets

$p(y_1|\alpha_1)$ DISTRIBUTION $p(y_2|\alpha_2)$ DISTRIBUTION

METHODS FOR TRAINING AUTO-LABELING DEVICE AND PERFORMING AUTO-LABELING BY USING HYBRID CLASSIFICATION AND DEVICES USING THE SAME

FIELD OF THE DISCLOSURE

The present disclosure relates to methods for training an auto-labeling device and performing an auto-labeling and devices using the same; and more particularly, to the methods for training the auto-labeling device and performing the auto-labeling by using a hybrid classification, and the devices using the same.

BACKGROUND OF THE DISCLOSURE

In order to improve an accuracy of a deep-learning network used for analyzing images, it is necessary to perform learning processes by comparing labeled images with results of analysis on unlabeled images from the deep-learning network. However, a large quantity of the labeled images is required for successful learning of the deep-learning network.

In a conventional method, a process of analyzing and labeling images is manually carried out by human experts, but this process is highly labor-intensive, time-consuming, and financially burdensome. As such, recent attempts to improve an efficiency of the process of analyzing and labeling the images through a development of an auto-labeling device adopting deep-learning are increasingly gaining attention.

However, the conventional auto-labeling method requires a substantial amount of time to produce true labels on an entire set of training images because a throughput of human verifiers is lower compared to that of the auto-labeling device. As a result, more human verifiers are needed to improve overall throughput, but this entails a rise in the cost.

Accordingly, improving an accuracy level of the auto-labeling device to produce accurately-labeled images and minimize the role of the human verifiers is desirable.

Also, to minimize the role of the human verifiers, one should seek to improve an accuracy not only in the auto-labeling itself but also in selecting training images to be further verified.

Therefore, an enhanced method for solving the aforementioned problems is required.

SUMMARY OF THE DISCLOSURE

It is an object of the present disclosure to solve all the aforementioned problems.

It is another object of the present disclosure to estimate an uncertainty score which is proportional to a possibility of a class prediction error being generated, regardless of an over-fitting of a confidence score.

It is still another object of the present disclosure to determine whether a given input data follows a presumed probability distribution function (PDF) by using a PDF fitness estimation module.

It is still yet another object of the present disclosure to generate a highly reliable class score and a highly reliable uncertainty score at a minimum additional cost by selecting an appropriate classification method according to a fitness value estimated by the PDF fitness estimation module.

In accordance with one aspect of the present disclosure, there is provided a method for training an auto-labeling device, including steps of: (a) a learning device, when a training image is acquired, performing a process of inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image; the learning device, performing processes of (i) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (iii) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (iv) allowing the auto-labeling device to apply a scale parameter to the second uncertainty score for training and thus to generate a scaled second uncertainty score for training; and (c) the learning device, performing processes of (i) generating a first loss by referring to the first class score for training and ground truth corresponding to the training image, to thereby train at least part of the first classification module and the feature extraction module through back-propagation by using the first loss, (ii) generating a second loss by referring to the second class score for training and the ground truth corresponding to the training image, to thereby train at least part of the second classification module and the feature extraction module through back-propagation by using the second loss, (iii) generating a third loss by referring to the first uncertainty score for training and the scaled second uncertainty score for training, to thereby update the scale parameter, and (iv) training the fitness estimation module through back-propagation by using a cross-entropy loss corresponding to the third loss.

As one example, at the step of (b), in the process of inputting the feature for training to the first classification module in the auto-labeling device, or allowing the auto-labeling device to input the feature for training to the first classification module, to thereby instruct the first classification module to perform the second fully-connected operation and the probability distribution function (PDF) operation on the feature for training and thus to output the first class score for training corresponding to the training image and its corresponding first uncertainty score for training, the learning device performs a process of allowing the first classification module to (i) perform the second fully-connected operation and a rectifier operation on the feature for training, to generate a first intermediary output for training, and (ii) perform the PDF operation on the first intermediary output, to generate the first class score for training and its corresponding first uncertainty score for training.

As another example, at the step of (b), in the process of inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing the third fully-connected operation thereon, for k times in parallel, thus to output the (2_1)-st to the (2_k)-th class scores for training, and thus to output the second class score for training and its corresponding second uncertainty score for training by referring to at least part of the (2_1)-st to the (2_k)-th class scores for training, the learning device performs a process of allowing the second classification module to (i) generate a second intermediary output for training by performing a (3_1)-st fully-connected operation on the feature for training, (ii) perform a set of operations including randomly setting at least one element of the feature for training to zero and performing a (3_2)-nd fully-connected operation thereon, for k times in parallel, to thereby output the (2_1)-st to the (2_k)-th class scores for training, and thus (iii) output the second class score for training and its corresponding second uncertainty score for training by referring to at least part of the (2_1)-st to the (2_k)-th class scores for training.

As another example, at the step of (c), in the process of training the fitness estimation module through back-propagation by using the cross-entropy loss corresponding to the third loss, the learning device performs a process of clipping the cross-entropy loss to have a value ranging from 0 to 1 if the cross-entropy loss has a value lying outside the range of 0 to 1, and thus training the fitness estimation module through back-propagation by using a clipped cross-entropy loss.

As another example, in the process of training the fitness estimation module through back-propagation by using the cross-entropy loss corresponding to the third loss, the learning device performs a process of training the fitness estimation module such that the fitness value for training is inversely proportional to a difference between the first uncertainty score for training and the second uncertainty score for training.

In accordance with still another aspect of the present disclosure, there is provided a method for performing auto-labeling, including steps of: (a) on condition that a learning device, when a training image is acquired, has performed processes of (i) inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image, (ii) (ii-1) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii-2) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (ii-3) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (ii-4) allowing the auto-labeling device to apply a scale parameter to the second uncertainty score for training and thus to generate a scaled second uncertainty score for training, and (iii) (iii-1) generating a first loss by referring to the first class score for training and ground truth corresponding to the training image, to thereby train at least part of the first classification module and the feature extraction module through back-propagation by using the first loss, (iii-2) generating a second loss by referring to the second class score for training and the ground truth corresponding to the training image, to thereby train at least part of the second classification module and the feature extraction module through back-propagation by using the second loss, (iii-3) generating a third loss by referring to the first uncertainty score for training and the second uncertainty score for training, to thereby update the scale parameter, and (iii-4) training the fitness estimation module through back-propagation by using a cross-entropy loss corresponding to the third loss, an auto-labeling device, when an unlabeled image is acquired, performing processes of (a1) inputting the unlabeled image to the feature extraction module, to thereby allow the feature extraction module to perform at least one convolutional operation on the unlabeled image and thus to generate at least one feature corresponding to the unlabeled image, and (a2) inputting the feature to the fitness estimation module, to thereby allow the fitness estimation module to perform the first fully-connected operation and the sigmoid operation on the feature and thus to output a fitness value, which is a value ranging from 0 to 1 predicting a difference between an uncertainty score corresponding to output information generated from a first classification module on the unlabeled image and an uncertainty score corresponding to output information generated from a second classification module on the unlabeled image; (b) the auto-labeling device, when the fitness value is acquired, performing processes of (b1) inputting the feature to the first classification module if the fitness value is larger than a predetermined threshold value, to thereby allow the first classification module to perform the second fully-connected operation and the probability distribution function (PDF) operation on the feature and thus to output a first class score corresponding to the unlabeled image and its corresponding first uncertainty score, and (b2) inputting the feature to the second classification module if the fitness value is smaller than or equal to the predetermined threshold value, to thereby allow the second classification module to perform the set of operations including randomly setting at least one element of the feature to zero and performing the third fully-connected operation thereon, for k times in parallel, thus to output a $(2\_1)$-st to a $(2\_k)$-th class scores, and thus to output a second class score and its corresponding second uncertainty score by referring to at least part of the $(2\_1)$-st to the $(2\_k)$-th class scores, after which a scale parameter is applied to the second uncertainty score to generate a scaled second uncertainty score; and (c) the auto-labeling device performing a process of generating a labeled image by labeling first class information corresponding to the first class score or second class information corresponding to the second class score, and transmitting a specific labeled image, which is generated by combining (i) a first label corresponding to first class information of the first uncertainty score exceeding a preset uncertainty score or a second label corresponding to second class information of the second uncertainty score exceeding the preset uncertainty score with (ii) the unlabeled image, to human experts, to thereby allow the human experts to verify the specific labeled image.

As one example, at the step of (b), in the process of inputting the feature to the first classification module, to thereby allow the first classification module to perform the second fully-connected operation and the probability distribution function (PDF) operation on the feature and thus to output the first class score corresponding to the unlabeled image and its corresponding first uncertainty score, the auto-labeling device performs a process of allowing the first classification module to (i) perform the second fully-connected operation and a rectifier operation on the feature, to generate a first intermediary output, and (ii) perform the PDF operation on the first intermediary output, to generate the first class score and its corresponding first uncertainty score.

As another example, at the step of (b), in the process of inputting the feature to the second classification module, to thereby allow the second classification module to perform a set of operations including randomly setting at least one element of the feature to zero and performing the third fully-connected operation thereon, for k times in parallel, thus to output the $(2\_1)$-st to the $(2\_k)$-th class scores, and thus to output the second class score and its corresponding second uncertainty score by referring to at least part of the $(2\_1)$-st to the $(2\_k)$-th class scores, the auto-labeling device performs a process of allowing the second classification module to (i) generate a second intermediary output by performing a $(3\_1)$-st fully-connected operation on the feature, (ii) perform a set of operations including randomly setting at least one element of the feature to zero and performing a $(3\_2)$-nd fully-connected operation thereon, for k times in parallel, to thereby output the $(2\_1)$-st to the $(2\_k)$-th class scores, and thus (iii) output the second class score and its corresponding second uncertainty score by referring to at least part of the $(2\_1)$-st to the $(2\_k)$-th class scores.

As another example, at the step of (c), the auto-labeling device performs a process of generating a fourth loss by referring to a verified labeled image which is verified by the human experts, and to the specific labeled image, to thereby (i) train the first classification module and the feature extraction module by using back-propagation with the fourth loss if the first uncertainty score exceeds the preset uncertainty score, and (ii) train the second classification module and the feature extraction module by using back-propagation with the fourth loss if the second uncertainty score exceeds the preset uncertainty score.

In accordance with still yet another aspect of the present disclosure, there is provided a learning device for A learning device for training an auto-labeling device, including: at least one memory that stores instructions; and at least one processor configured to execute the instructions to perform or support another device to perform: (I) when a training image is acquired, a process of inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image; (II) processes of (i) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (iii) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a $(2\_1)$-st to a $(2\_k)$-th class scores for training, and thus to output a second class score for training and its corresponding second uncertainty score for training by referring to at least part of the $(2\_1)$-st to the $(2\_k)$-th class scores for training, and (iv) allowing the auto-labeling device to apply a scale parameter to the second uncertainty score for training and thus to generate a scaled second uncertainty score for training; and (III) processes of (i) generating a first loss by referring to the first class score for training and ground truth corresponding to the training image, to thereby train at least part of the first classification module and the feature extraction module through back-propagation by using the first loss, (ii) generating a second loss by referring to the second class score for training and the ground truth corresponding to the training image, to thereby train at least part of the second classification module and the feature extraction module through back-propagation by using the second loss, (iii) generating a third loss by referring to the first uncertainty score for training and the scaled second uncertainty score for training, to thereby update the scale parameter, and (iv) training the fitness estimation module through back-propagation by using a cross-entropy loss corresponding to the third loss.

As one example, at the step of (II), in the process of inputting the feature for training to the first classification module in the auto-labeling device, or allowing the auto-labeling device to input the feature for training to the first classification module, to thereby instruct the first classification module to perform the second fully-connected operation and the probability distribution function (PDF) operation on the feature for training and thus to output the first class score for training corresponding to the training image and its corresponding first uncertainty score for training, the processor performs a process of allowing the first classification module to (i) perform the second fully-connected operation and a rectifier operation on the feature for training, to generate a first intermediary output for training, and (ii) perform the PDF operation on the first intermediary output, to generate the first class score for training and its corresponding first uncertainty score for training.

As another example, at the step of (II), in the process of inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing the third fully-connected operation thereon, for k times in parallel, thus to output the (2_1)-st to the (2_k)-th class scores for training, and thus to output the second class score for training and its corresponding second uncertainty score for training by referring to at least part of the (2_1)-st to the (2_k)-th class scores for training, the processor performs a process of allowing the second classification module to (i) generate a second intermediary output for training by performing a (3_1)-st fully-connected operation on the feature for training, (ii) perform a set of operations including randomly setting at least one element of the feature for training to zero and performing a (3_2)-nd fully-connected operation thereon, for k times in parallel, to thereby output the (2_1)-st to the (2_k)-th class scores for training, and thus (iii) output the second class score for training and its corresponding second uncertainty score for training by referring to at least part of the (2_1)-st to the (2_k)-th class scores for training.

As another example, at the step of (III), in the process of training the fitness estimation module through back-propagation by using the cross-entropy loss corresponding to the third loss, the processor performs a process of clipping the cross-entropy loss to have a value ranging from 0 to 1 if the cross-entropy loss has a value lying outside the range of 0 to 1, and thus training the fitness estimation module through back-propagation by using a clipped cross-entropy loss.

As another example, at the step of (III), in the process of training the fitness estimation module through back-propagation by using the cross-entropy loss corresponding to the third loss, the processor performs a process of training the fitness estimation module such that the fitness value for training is inversely proportional to a difference between the first uncertainty score for training and the second uncertainty score for training.

In accordance with still yet another aspect of the present disclosure, there is provided an auto-labeling device for performing auto-labeling, including: at least one memory that stores instructions; and at least one processor configured to execute the instructions to perform or support another device to perform: (I) on condition that a learning device, when a training image is acquired, has performed processes of (i) inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image, (ii) (ii-1) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii-2) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (ii-3) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (ii-4) allowing the auto-labeling device to apply a scale parameter to the second uncertainty score for training and thus to generate a scaled second uncertainty score for training, and (iii) (iii-1) generating a first loss by referring to the first class score for training and ground truth corresponding to the training image, to thereby train at least part of the first classification module and the feature extraction module through back-propagation by using the first loss, (iii-2) generating a second loss by referring to the second class score for training and the ground truth corresponding to the training image, to thereby train at least part of the second classification module and the feature extraction module through back-propagation by using the second loss, (iii-3) generating a third loss by referring to the first uncertainty score for training and the second uncertainty score for training, to thereby update the scale parameter, and (iii-4) training the fitness estimation module through back-propagation by using a cross-entropy loss corresponding to the third loss, when an unlabeled image is acquired, processes of (I-1) inputting the unlabeled image to the feature extraction module, to thereby allow the feature extraction module to perform at least one convolutional operation on the unlabeled image and thus to generate at least one feature corresponding to the unlabeled image, and (I-2) inputting the feature to the fitness estimation module, to thereby allow the fitness estimation module to perform the first fully-connected operation and the sigmoid operation on the feature and thus to output a fitness value, which is a value ranging from 0 to 1 predicting a difference between an uncertainty score corresponding to output information generated from a first classification module on the unlabeled image and an uncertainty score corresponding to output information generated from a second classification module on the unlabeled image; (II) when the fitness value is acquired, processes of (II-1) inputting the feature to the first classification module if the fitness value is larger than a predetermined threshold value, to thereby allow the first classification module to perform the second fully-connected operation and the probability distribution function (PDF) operation on the feature and thus to output a first class score corresponding to the unlabeled image and its corresponding first uncertainty score, and (II-2) inputting the feature to the second classification module if the fitness value is smaller than or equal to the predetermined threshold value, to thereby allow the second classification module to perform the set of operations including randomly setting at least one element of the feature to zero and performing the third fully-connected operation thereon, for k times in parallel, thus to output a $(2\_1)$-st to a $(2\_k)$-th class scores, and thus to output a second class score and its corresponding second uncertainty score by referring to at least part of the $(2\_1)$-st to the $(2\_k)$-th class scores, after which a scale parameter is applied to the second uncertainty score to generate a scaled second uncertainty score; and (III) a process of generating a labeled image by labeling first class information corresponding to the first class score or second class information corresponding to the second class score, and transmitting a specific labeled image, which is generated by combining (i) a first label corresponding to first class information of the first uncertainty score exceeding a preset uncertainty score or a second label corresponding to second class information of the second uncertainty score exceeding the preset uncertainty score with (ii) the unlabeled image, to human experts, to thereby allow the human experts to verify the specific labeled image.

As one example, at the step of (II), in the process of inputting the feature to the first classification module, to thereby allow the first classification module to perform the second fully-connected operation and the probability distribution function (PDF) operation on the feature and thus to output the first class score corresponding to the unlabeled image and its corresponding first uncertainty score, the processor performs a process of allowing the first classification module to (i) perform the second fully-connected operation and a rectifier operation on the feature, to generate a first intermediary output, and (ii) perform the PDF operation on the first intermediary output, to generate the first class score and its corresponding first uncertainty score.

As another example, at the step of (II), in the process of inputting the feature to the second classification module, to thereby allow the second classification module to perform a set of operations including randomly setting at least one element of the feature to zero and performing the third fully-connected operation thereon, for k times in parallel, thus to output the $(2\_1)$-st to the $(2\_k)$-th class scores, and thus to output the second class score and its corresponding second uncertainty score by referring to at least part of the $(2\_1)$-st to the $(2\_k)$-th class scores, the processor performs a process of allowing the second classification module to (i) generate a second intermediary output by performing a $(3\_1)$-st fully-connected operation on the feature, (ii) perform a set of operations including randomly setting at least one element of the feature to zero and performing a $(3\_2)$-nd fully-connected operation thereon, for k times in parallel, to thereby output the $(2\_1)$-st to the $(2\_k)$-th class scores, and thus (iii) output the second class score and its corresponding second uncertainty score by referring to at least part of the $(2\_1)$-st to the $(2\_k)$-th class scores.

As another example, at the step of (III), the processor performs a process of generating a fourth loss by referring to a verified labeled image which is verified by the human experts, and to the specific labeled image, to thereby (i) train the first classification module and the feature extraction module by using back-propagation with the fourth loss if the first uncertainty score exceeds the preset uncertainty score, and (ii) train the second classification module and the feature extraction module by using back-propagation with the fourth loss if the second uncertainty score exceeds the preset uncertainty score.

In addition, recordable media that are readable by a computer for storing a computer program to execute the method of the present disclosure is further provided.

BRIEF DESCRIPTION ON THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
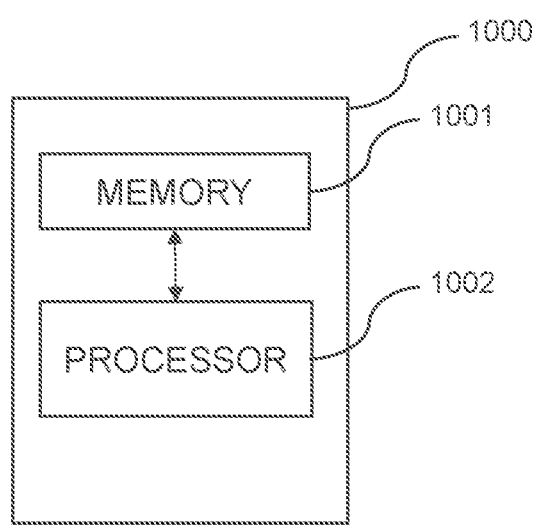
FIG. 1 is a drawing schematically illustrating a learning device for training an auto-labeling device in accordance with one example embodiment of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

For reference, throughout the present disclosure, the phrase "for training" or "training" is added to terms related to training processes, and the phrase "for testing", "testing", or "test" is added to terms related to testing processes, to avoid possible confusion.

To allow those skilled in the art to carry out the present disclosure easily, the example embodiments of the present disclosure will be explained by referring to attached diagrams in detail as shown below.

FIG. 1 is a drawing schematically illustrating a learning device 1000 for training an auto-labeling device in accordance with one example embodiment of the present disclosure.

By referring to FIG. 1, the learning device 1000 may include a memory 1001 for storing instructions to train the auto-labeling device and a processor 1002 for training the auto-labeling device according to the instructions in the memory 1001.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

The detailed description about a process of training the auto-labeling device 2000 by using the learning device 1000 configured as above in accordance with one example embodiment of the present disclosure is provided below by referring to FIG. 2 to FIG. 6.

Figure 2:
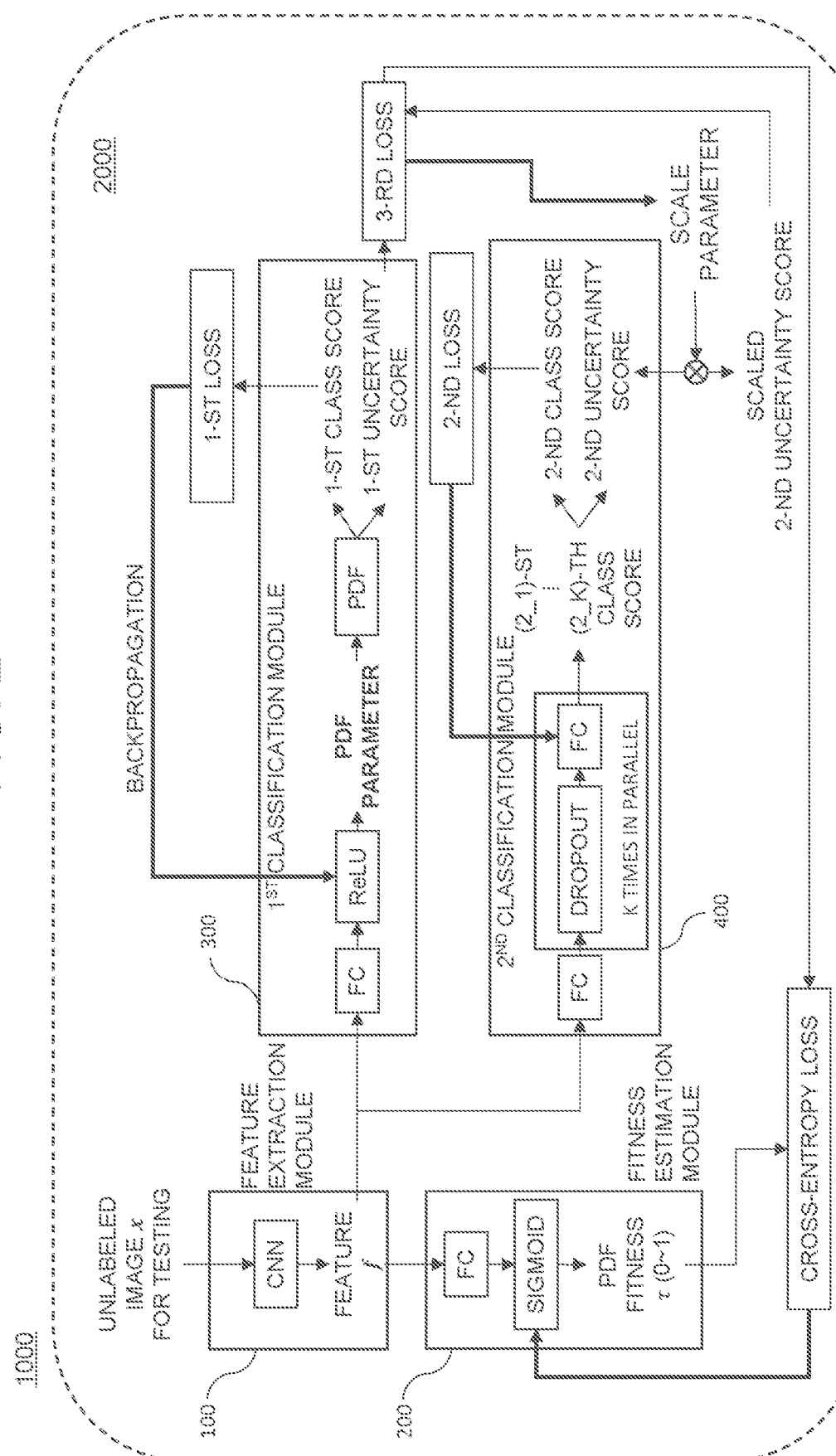
FIG. 2 is a drawing schematically illustrating a process of training the auto-labeling device in accordance with one example embodiment of the present disclosure.

First, as illustrated in FIG. 2, the auto-labeling device 2000 may be comprised of a feature extraction module 100 for extracting at least one feature from an acquire image, a fitness estimation module 200 for estimating a fitness value by referring to the feature, a first classification module 300 for computing a first class score and a first uncertainty score corresponding to the feature, and a second classification module 400 for computing a second class score and a second uncertainty score corresponding to the feature. Herein, the first classification module 300 and the second classification module 400 may perform a hybrid classification.

By referring to FIG. 2, in the process of training the auto-labeling device 2000 capable of performing the labeling by using the hybrid classification, when a training image is acquired, a learning device 1000 may perform a process of inputting the training image to the feature extraction module 100 in the auto-labeling device 2000, or allowing the auto-labeling device 2000 to input the training image to the feature extraction module 100, to thereby instruct the feature extraction module 100 to perform at least one convolutional operation on the training image and thus to generate at least one feature for training corresponding to the training image.

Thereafter, the learning device 1000 may perform a process of (i) inputting the feature for training to the fitness estimation module 200 in the auto-labeling device 2000, or allowing the auto-labeling device 2000 to input the feature for training to the fitness estimation module 200, to thereby instruct the fitness estimation module 200 to perform a first fully-connected operation and a sigmoid operation on the feature for training and thus to output a fitness value for training, which is a value ranging from 0 to 1 predicting a difference between an uncertainty score for training corresponding to output information generated from the first classification module 300 on the training image and an uncertainty score for training corresponding to output information generated from the second classification module 400 on the training image, (ii) inputting the feature for training to the first classification module 300 in the auto-labeling device 2000, or allowing the auto-labeling device 2000 to input the feature for training to the first classification module 300, to thereby instruct the first classification module 300 to perform a second fully-connected operation and a probability distribution function (PDF) operation on the feature for training and thus to output a first class score for training corresponding to the training image and its corresponding first uncertainty score for training, (iii) inputting the feature for training to the second classification module 400 in the auto-labeling device 2000, or allowing the auto-labeling device 2000 to input the feature for training to the second classification module 400, to thereby instruct the second classification module 400 to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (iv) allowing the auto-labeling device 2000 to apply a scale parameter to the second uncertainty score for training and thus to generate a scaled second uncertainty score for training.

Herein, the scale parameter may be applied to the second uncertainty score for training so that the minimum-maximum range of the first uncertainty score for training matches with the minimum-maximum range of the scaled second uncertainty score for training.

Meanwhile, the uncertainty score may represent a possibility of a class prediction error being generated. When an image is acquired, a classification network may classify input data corresponding to the image into c classes, and output each of class scores for each of the c classes. Accordingly, a class with the highest class score may be determined as a predicted class, and the corresponding highest class score may be determined as a confidence score. When such a classification network is applied to an auto-labeling, only a labeled image with the confidence score lower than a preset confidence score threshold value may be given to human experts for further verification.

Figure 3:
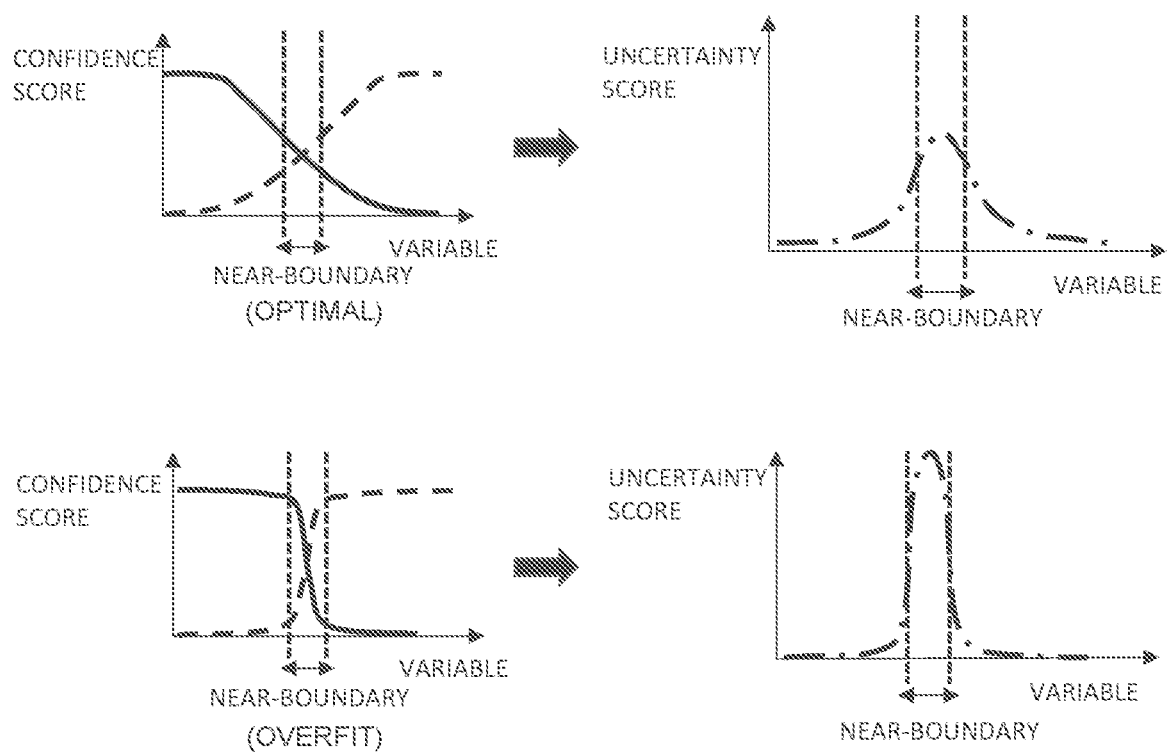
FIG. 3 to FIG. 6 are drawings schematically illustrating methods for estimating a class score and an uncertainty score in accordance with one example embodiment of the present disclosure.

However, in case the classification network is over-fitted to training data, the confidence score may be estimated to be high regardless of an actual accuracy level of class prediction, resulting in making the confidence score be an unreliable measure for representing the accuracy level of the class prediction. By referring to FIG. 3 schematically illustrating a method for estimating an uncertainty score for the class prediction, it can be seen that under an optimal situation, the confidence score may drop near a decision boundary region to show a reasonable change in the confidence score as the input data changes. On the other hand, under a situation where the classification network is over-fitted, the confidence score near the decision boundary region may still be maintained high, and as such, even a slight change in the input data is accompanied by a drastic drop in the confidence score.

Therefore, the present disclosure may determine a degree of reliability of the class prediction by measuring the uncertainty score instead of the confidence score. Herein, the accuracy level of the confidence score may drop in case the over-fitting occurs. By referring to FIG. 3, it can be seen that uncertainty score estimation may be carried out by statistically measuring the degree of reliability of the class prediction, and this can yield the uncertainty score proportional to the possibility of the class prediction error being generated, regardless of the over-fitting of the confidence score.

In the process of inputting the feature for training to the first classification module 300 in the auto-labeling device 2000, or allowing the auto-labeling device 2000 to input the feature for training to the first classification module 300, to thereby instruct the first classification module 300 to output the first class score for training corresponding to the training image and its corresponding first uncertainty score for training, by referring again to FIG. 2, the learning device 1000 may perform a process of allowing the first classification module 300 to (i) perform the second fully-connected operation and a rectifier operation on the feature for training, to generate a first intermediary output for training, and (ii) perform the PDF operation on the first intermediary output, to generate the first class score for training and its corresponding first uncertainty score for training.

Herein, the rectifier operation may set a range of the first intermediary value for training to be bigger than or equal to zero. Then, the intermediary value may be used as a PDF parameter for the PDF operation.

Meanwhile, an approach such as Bayesian deep learning method may be adopted for the first classification module 300 to generate the class score and the uncertainty score. The Bayesian deep learning method may assume that the class prediction follows a specific probability distribution function (PDF), and train the classification network such that the specific PDF fits the training data. Some of commonly used PDFs, such as Gaussian distribution and Dirichlet distribution, etc., may calculate means, variances and various randomness measures using formulae. Thus, the Bayesian deep learning method may calculate a desired randomness measure according to the formulae by performing just one inference on one input data under the assumption that the class prediction follows the specific PDF.

Figure 4:
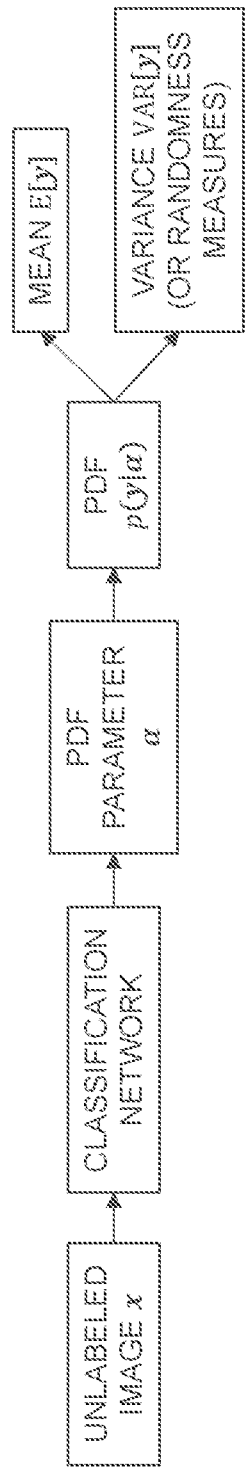

Describing the Bayesian deep learning method by referring to FIG. 4, the class score $y=[y_1, y_2, \ldots, y_c]$, which is an output from the classification network, may be used as PDF parameter $\alpha_j$. For example, when it is assumed that the class prediction follows the Dirichlet distribution, a probability of the PDF may be calculated using the PDF parameter as follows.

$$p(y \mid \alpha) = \frac{\Gamma\left(\sum_{j=1}^{C} \alpha_j\right)}{\prod_{j=1}^{C} \Gamma(\alpha_j)} \sum_{j=1}^{C} y_j^{\alpha_j - 1}, \alpha_j \geq 0$$

Herein, $\Gamma$ represents gamma function, and Rectified Linear Unit (ReLU) layer may be used as the last layer of the classification network to satisfy the condition of $\alpha_j$ being bigger than or equal to 0. The ReLU layer may output an element of an input tensor as it is if the element is a positive figure, and convert to 0 if the value of the element is a negative figure.

Also, when the Bayesian deep learning method is adopted, an expected loss may be used as a loss corresponding to the class score y since the class score y is statistically defined, and a gradient corresponding to the expected loss may be back-propagated to train the classification network. Therefore, the class score generated from the first classification module 300 may be an expected class score which is statistically defined by using the PDF. For example, if the class score y follows the Dirichlet distribution and the loss corresponding to the class score y is defined as a cross-entropy loss, the expected loss may be calculated as below.

$$E[L(y \mid y^*)] = \int \left[\sum_{j=1}^{C} -y_j^* \log(y_j)\right] p(y) dy = \sum_{j=1}^{C} y_j^* (\psi(S) - \psi(\alpha_j))$$

Herein, $y^*$ is ground truth, $\psi$ represent digamma function, and S is a sum of the PDF parameter $\alpha_j$. Then, the sum S may be computed by using the formula $$\sum_{j=1}^{C} \alpha_j.$$

In addition, when the Dirichlet distribution is adopted, the uncertainty score in addition to a mean and a variance can be calculated by using following formulae.

$$E[y_j] = \frac{\alpha_j}{S}$$

$$\mathrm{Var}[y_j] = \frac{\alpha_j(S - \alpha_j)}{S^2(S+1)}$$

$$\text{Uncertainty Score}(y \mid \alpha) = \frac{C}{C+S}$$

The above uncertainty score may be derived by formulating theory on the uncertainty called Dempster-Shafer theory of evidence (or belief theory) as the Dirichlet distribution as described in "Interpreting Belief Functions as Dirichlet Distributions" (Audun Jøsang et al.). In addition, the formula for finding the uncertainty score as described above may imply that the sum S of the PDF parameter $\alpha_j$ is smaller when the uncertainty score is larger. For example, given that $\alpha_1$=[0.1, 0.01, 0] ($S_1$=0.11) and $\alpha_2$=[10, 1, 0] ($S_2$=11), mean values of the two PDF parameters are equal, but uncertainty scores of the two PDF parameters differ.

$$E[y_1] = \frac{\alpha_1}{s_1} = E[y_2] = \frac{\alpha_2}{s_2} = [0.91, 0.09, 0]$$

$$U(y_1 \mid \alpha_1) = \frac{3}{3 + 0.11} = 0.96$$

$$U(y_2 \mid \alpha_2) = \frac{3}{3 + 11} = 0.21$$

Figure 5:
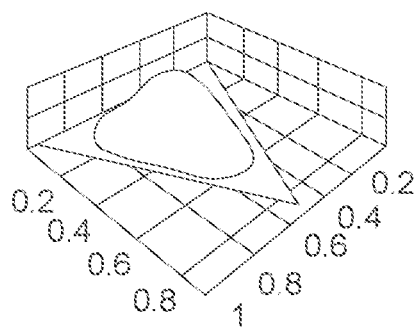
Figure 5:
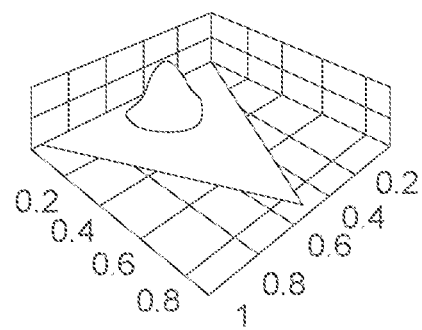

By referring to FIG. 5, when distributions of $p(y_1|\alpha_1)$ and $p(y_2|\alpha_2)$ are plotted, the location of the mean values of $\alpha_1$ and $\alpha_2$ are identical, but the distribution of $p(y_1|\alpha_1)$ is more widely spread as compared to the distribution of $p(y_2|\alpha_2)$. Herein, a larger distribution of $p(y_1|\alpha_1)$ may imply that an accurate prediction of the class score is more difficult, meaning that the input data exists in a region that is difficult to be classified, i.e., in a region near the decision boundary.

Therefore, if a process of training the classification network is carried out by using the Bayesian deep learning method with the Dirichlet distribution assumed, a distribution pattern of the class score y is determined according to the PDF parameter $\alpha$, and the trained classification network may minimize the expected loss such that each of the uncertainty scores for each of the input data may be measured accurately even with just single iteration of inference (reference material: "Evidential Deep Learning to Quantify Classification Uncertainty" (Murat Sensoy et al.)). Especially, since the Dirichlet distribution is a probability distribution for a non-negative vector whose sum of each element is 1, it is reasonable to assume that softmax vectors like the class score follow the Dirichlet distribution. Also, as the Dirichlet distribution has a separate formula for calculating the uncertainty score ranging from 0 to 1, apart from the formula for variance, the degree of reliability of the class prediction may be easily measured when the Dirichlet distribution is applied to the classification network.

However, there exists a limitation for the Bayesian deep learning method in that the Bayesian deep learning method is applicable only when the assumption of the class prediction following a given PDF holds true. As such, in case the class prediction does not conform to the given PDF, the accuracy level of the class prediction may drastically drop.

In the process of inputting the feature for training to the second classification module 400 in the auto-labeling device 2000, or allowing the auto-labeling device 2000 to input the feature for training to the second classification module 400, to thereby instruct the second classification module 400 to output the second class score for training and its corresponding second uncertainty score, by referring again to FIG. 2, the learning device 1000 may perform a process of allowing the second classification module 400 to (i) generate a second intermediary output for training by performing a (3_1)-st fully-connected operation on the feature for training, (ii) perform a set of operations including randomly setting at least one element of the feature for training to zero and performing a (3_2)-nd fully-connected operation thereon, for k times in parallel, to thereby output the (2_1)-st to the (2_k)-th class scores for training, and thus (iii) output the second class score for training and its corresponding second uncertainty score for training by referring to at least part of the (2_1)-st to the (2_k)-th class scores for training.

Herein, an approach such as Monte Carlo method may be adopted for the second classification module 400 to generate the class score and the uncertainty score. In estimating the uncertainty score of the class prediction, a method of generating randomness on outputs of the classification network to generate multiple random outputs and thus to measure mismatch among the random outputs may exist. There may be various ways to generate the randomness. For example, a method of inserting a dropout layer which randomly set at least one element of the input tensor to zero according to a preset rate is commonly applied to the classification network.

Since the concept of the dropout layer is conventionally adopted to prevent the over-fitting of the classification network during training, the inference after completion of the training is performed without the dropout layer to generate a stable output. On the other hand, in the Monte Carlo method, the inference on the input data is performed multiple times with the dropout layer to generate multiple random outputs and estimate the uncertainty score thereon.

Figure 6:
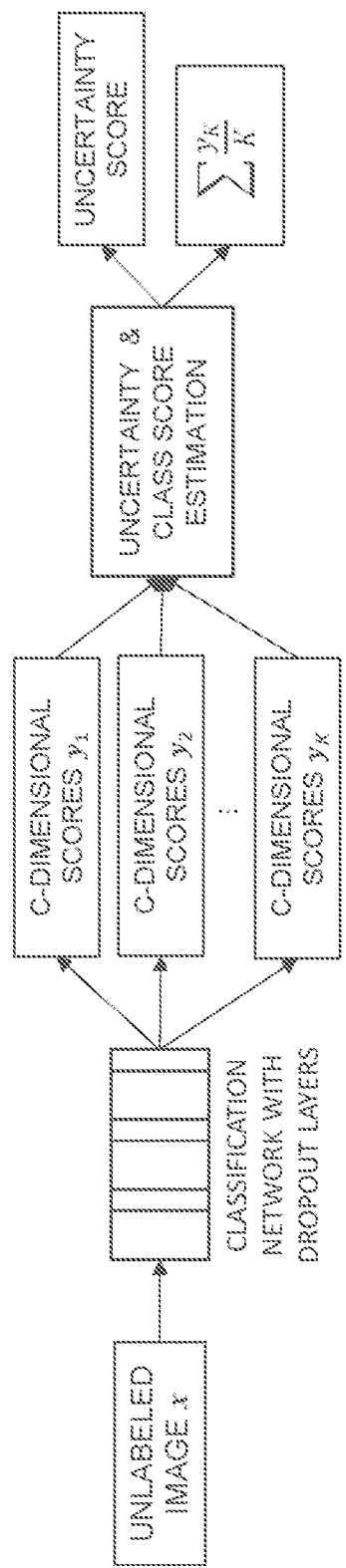

Describing the Monte Carlo method by referring to FIG. 6, each random output $y_i$ in the classification network capable of classifying the c classes may be a c-dimensional softmax vector having a form of $[y_{i1}, y_{i2}, \ldots, y_{iC}]$, whereby a sum of each element of the vector, i.e., $y_{i1}+y_{i2}+\ldots+y_{iC}$, is equal to 1. While various values such as variance or entropy among the random outputs may be used as the uncertainty score, a measure called BALD (Bayesian Active Learning by Disagreement) is known as an effective method to measure the uncertainty score. By referring to "Bayesian Active Learning for Classification and Preference Learning" (Neil Houlsby et al.), BALD may calculate the uncertainty score using the following formula.

$$\text{Uncertainty}(y) = \text{Entropy}\left(\frac{y_1 + y_2 + \ldots + y_K}{K}\right) - \frac{1}{K}\sum_{i=1}^{K} \text{Entropy}(y_i)$$

According to the formula above, if each $y_i$ predicts different class scores with very high confidence scores, a high uncertainty score is yielded. For example, given values of $y_1=[0.9, 0.1, 0]$, $y_2=[0.01, 0.99, 0]$, $y_3=[0, 0, 1]$, $y_4=[0, 0, 1]$, since each $y_i$ is a one-hot vector or nearly a one-hot vector, values of Entropy($y_i$) for each $y_i$ is 0.33, 0.06, 0, 0, which are significantly small. On the other hand, as each $y_i$ is predicting classes different from each other, their mean $$\frac{y_1 + y_2 + \ldots + y_K}{K} = [0.23, 0.27, 0.5]$$

is close to a uniform vector, and entropy of the mean has a significantly large value of 1.04. Accordingly, since the first term of the formula above is significantly large and the second term is significantly small, the uncertainty score has a large value.

As described above, while the accuracy levels of the class prediction and the uncertainty score estimation increase in the Monte Carlo method as a result of performing multiple inferences on one input data, the time and the cost required for the inference also increase as the number of inference increases.

Therefore, by taking into account that the Bayesian deep learning method does not generate a reliable uncertainty score if the class prediction does not conform to a presumed PDF, while the Monte Carlo method generates a reliable uncertainty score only when sufficient number of inference is carried out, the present disclosure may satisfy both an accuracy and a cost efficiency through the method of adopting the Monte Carlo method only when the Bayesian deep learning method is not applicable. Herein, the classification network may be trained to make a more accurate decision on whether to use the Monte Carlo method by training with both cases in which the class prediction follows the presumed distribution or does not follow the presumed distribution.

In other words, the present disclosure may determine whether the input data fits the presumed PDF by using the PDF fitness estimation module 200, and thus select the Bayesian deep learning method or the Monte Carlo method according to the fitness value derived from the PDF fitness estimation module, to thereby generate a highly reliable class score and a highly reliable uncertainty score at a minimum additional cost.

By referring to FIG. 2 again, the learning device 1000, after acquiring the fitness value for training, the first class score for training, the first uncertainty score for training, the second class score for training, and the second uncertainty score for training, may perform processes of (i) generating a first loss by referring to the first class score for training and ground truth corresponding to the training image, to thereby train at least part of the first classification module 300 and the feature extraction module 100 through back-propagation by using the first loss, (ii) generating a second loss by referring to the second class score for training and the ground truth corresponding to the training image, to thereby train at least part of the second classification module 400 and the feature extraction module 100 through back-propagation by using the second loss, (iii) generating a third loss by referring to the first uncertainty score for training and the scaled second uncertainty score for training, to thereby update the scale parameter, and (iv) training the fitness estimation module 200 through back-propagation by using a cross-entropy loss corresponding to the third loss.

Herein, as mentioned previously, the scaled second uncertainty score is generated by applying the scale parameter to the second uncertainty score for training, so that the minimum-maximum range of the first uncertainty score for training matches with the minimum-maximum range of the scaled second uncertainty score for training. Consequently, the third loss is used for updating the scale parameter to ensure that the minimum-maximum range of the first uncertainty score for training matches with the minimum-maximum range of the scaled second uncertainty score for training.

Also, if the first class score for training generated from the first classification module 300 is statistically defined by PDF, the first loss may be an expected loss. On the other hand, the second loss may be generated by (i) comparing each of the (2_1)-st to the (2_k)-th class scores for training with the ground truth corresponding to the training image, (ii) calculating averaged sum of the losses generated by comparing each of the (2_1)-st to the (2_k)-th class scores for training with the ground truth corresponding to the training image, or (iii) comparing the second class score for training with the ground truth corresponding to the training image. Also, the third loss may be generated by using the difference between the first uncertainty score for training and the scaled second uncertainty score for training.

Meanwhile, as the Monte Carlo method applied to the second classification module 400 may generate a highly reliable uncertainty score when k is sufficiently large, if the first uncertainty score for training and the scaled second uncertainty score for training are significantly different on condition that the minimum-maximum range of the first uncertainty score for training and the minimum-maximum range of the scaled second uncertainty score for training have been matched properly, it may be assumed that the first uncertainty score for training is wrongly measured. This may imply that the input data exists in the region where the PDF presumed for using the Bayesian deep learning method is not applicable, and in such case, it is a training principle of the present disclosure to train the PDF fitness estimation module 200 to generate a lower fitness value for the corresponding region.

Also, in the process of training the fitness estimation module 200 through back-propagation by using the cross-entropy loss corresponding to the third loss, the learning device may perform processes of (i) clipping the cross-entropy loss to have a value ranging from 0 to 1 if the cross-entropy loss has a value lying outside the range of 0 to 1, and thus training the fitness estimation module 200 through back-propagation by using a clipped cross-entropy loss, and (ii) training the fitness estimation module 200 such that the fitness value for training is inversely proportional to the difference between the first uncertainty score for training and the second uncertainty score for training. In other words, the cross-entropy loss may be generated by subtracting the difference between the first uncertainty score for training and the scaled second uncertainty score for training, i.e., the third loss, from 1, such that the fitness value for training is inversely proportional to the difference between the first uncertainty score for training and the second uncertainty score for training.

Figure 7:
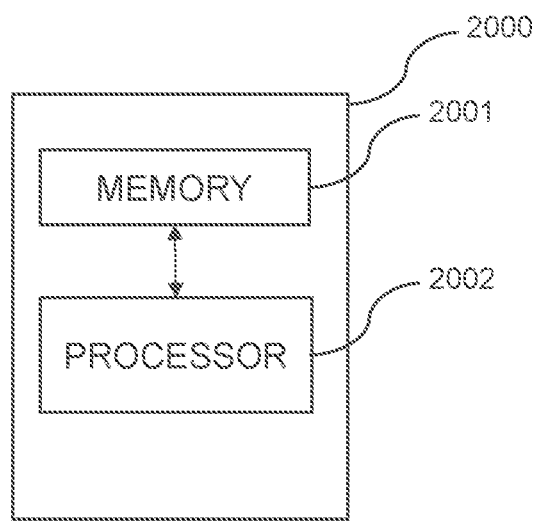
FIG. 7 is a drawing schematically illustrating the auto-labeling device performing an auto-labeling by using a hybrid classification in accordance with one example embodiment of the present disclosure.

FIG. 7 is a drawing schematically illustrating the auto-labeling device 2000 performing the auto-labeling by using the hybrid classification in accordance with one example embodiment of the present disclosure, under the condition in which the process of learning for the auto-labeling device 2000 has been carried out by using the learning method described above.

By referring to FIG. 7, the auto-labeling device 2000 may include a memory 2001 for storing instructions to perform the auto-labeling by using the hybrid classification and a processor 1002 for performing the auto-labeling by using the hybrid classification according to the instructions in the memory 1001.

Specifically, the auto-labeling device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Figure 8:
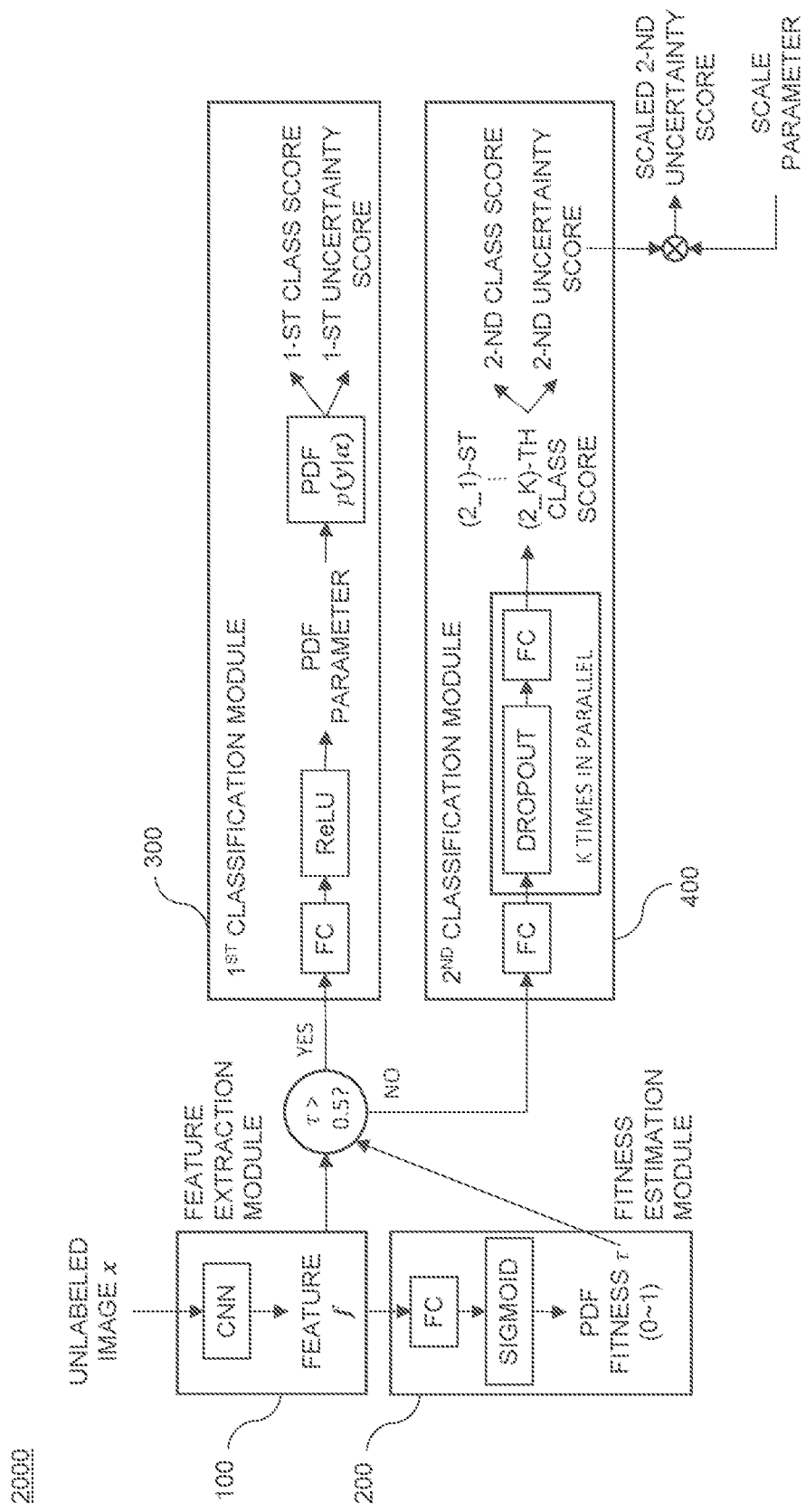
FIG. 8 is a drawing schematically illustrating a process of performing the auto-labeling by using the hybrid classification in accordance with one example embodiment of the present disclosure.

The detailed description about a process of the auto-labeling through the hybrid classification carried out by the auto-labeling device 2000 as configured above in accordance with one example embodiment of the present disclosure is provided below by referring to FIG. 8.

On condition that the learning device 1000 has trained the auto-labeling device 2000 using the method described with reference to FIG. 2, the auto-labeling device 2000, when an unlabeled image is acquired, may perform processes of (i) inputting the unlabeled image to the feature extraction module 100, to thereby allow the feature extraction module 100 to perform at least one convolutional operation on the unlabeled image and thus to generate at least one feature corresponding to the unlabeled image, and (ii) inputting the feature to the fitness estimation module 200, to thereby allow the fitness estimation module 200 to perform the first fully-connected operation and the sigmoid operation on the feature and thus to output a fitness value, which is a value ranging from 0 to 1 predicting a difference between an uncertainty score corresponding to output information generated from a first classification module 300 on the unlabeled image and an uncertainty score corresponding to output information generated from a second classification module 400 on the unlabeled image.

Next, the auto-labeling device 2000, when the fitness value is acquired, may perform processes of (i) inputting the feature to the first classification module 300 if the fitness value is larger than a predetermined threshold value, to thereby allow the first classification module 300 to perform the second fully-connected operation and the probability distribution function (PDF) operation on the feature and thus to output a first class score corresponding to the unlabeled image and its corresponding first uncertainty score, and (ii) inputting the feature to the second classification module 400 if the fitness value is smaller than or equal to the predetermined threshold value, to thereby allow the second classification module 400 to perform the set of operations including randomly setting at least one element of the feature to zero and performing the third fully-connected operation thereon, fork times in parallel, thus to output a (2_1)-st to a (2_k)-th class scores, and thus to output a second class score and its corresponding second uncertainty score by referring to at least part of the (2_1)-st to the (2_k)-th class scores, after which a scale parameter is applied to the second uncertainty score to generate a scaled second uncertainty score. Herein, a method for generating the first class score and its corresponding first uncertainty score, and a method for generating second class score and its corresponding second uncertainty score may be similar to the method described with reference to FIG. 2 to FIG. 6.

After acquiring the first class score and its corresponding first uncertainty score, and the second class score and its corresponding second uncertainty score, the auto-labeling device 2000 may perform a process of generating a labeled image by labeling first class information corresponding to the first class score or second class information corresponding to the second class score, and transmitting a specific labeled image, which is generated by combining (i) a first label corresponding to first class information of the first uncertainty score exceeding a preset uncertainty score or a second label corresponding to second class information of the second uncertainty score exceeding the preset uncertainty score with (ii) the unlabeled image, to human experts, to thereby allow the human experts to verify the specific labeled image.

Then, the auto-labeling device 200 may perform a process of generating a fourth loss by referring to a verified labeled image which is verified by the human experts, and to the specific labeled image, to thereby (i) train the first classification module 300 and the feature extraction module 100 by using back-propagation with the fourth loss if the first uncertainty score exceeds the preset uncertainty score, and (ii) train the second classification module 400 and the feature extraction module 100 by using back-propagation with the fourth loss if the second uncertainty score exceeds the preset uncertainty score.

The present disclosure has an effect of estimating the uncertainty score which is proportional to a possibility of the class prediction error being generated, regardless of the over-fitting of a confidence score.

The present disclosure has another effect of determining whether the given input data follows the presumed probability distribution function (PDF) by using the PDF fitness estimation module.

The present disclosure has still another effect of generating a highly reliable class score and a highly reliable uncertainty score at a minimum additional cost by selecting an appropriate classification method according to the fitness value estimated by the PDF fitness estimation module.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as one or more software modules to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training an auto-labeling device, comprising steps of:
   (a) a learning device, when a training image is acquired, performing a process of inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image;
   (b) the learning device, performing processes of (i) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (iii) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (iv) allowing the auto-labeling device to apply a scale parameter to the second uncertainty score for training and thus to generate a scaled second uncertainty score for training; and
   (c) the learning device, performing processes of (i) generating a first loss by referring to the first class score for training and ground truth corresponding to the training image, to thereby train at least part of the first classification module and the feature extraction module through back-propagation by using the first loss, (ii) generating a second loss by referring to the second class score for training and the ground truth corresponding to the training image, to thereby train at least part of the second classification module and the feature extraction module through back-propagation by using the second loss, (iii) generating a third loss by referring to the first uncertainty score for training and the scaled second uncertainty score for training, to thereby update the scale parameter, and (iv) training the fitness estimation module through back-propagation by using a cross-entropy loss corresponding to the third loss.

2. The method of claim 1, wherein, at the step of (b), in the process of inputting the feature for training to the first classification module in the auto-labeling device, or allowing the auto-labeling device to input the feature for training to the first classification module, to thereby instruct the first classification module to perform the second fully-connected operation and the probability distribution function (PDF) operation on the feature for training and thus to output the first class score for training corresponding to the training image and its corresponding first uncertainty score for training,
   the learning device performs a process of allowing the first classification module to (i) perform the second fully-connected operation and a rectifier operation on the feature for training, to generate a first intermediary output for training, and (ii) perform the PDF operation on the first intermediary output, to generate the first class score for training and its corresponding first uncertainty score for training.

3. The method of claim 1, wherein, at the step of (b), in the process of inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing the third fully-connected operation thereon, for k times in parallel, thus to output the (2_1)-st to the (2_k)-th class scores for training, and thus to output the second class score for training and its corresponding second uncertainty score for training by referring to at least part of the (2_1)-st to the (2_k)-th class scores for training,
   the learning device performs a process of allowing the second classification module to (i) generate a second intermediary output for training by performing a (3_1)-st fully-connected operation on the feature for training, (ii) perform a set of operations including randomly setting at least one element of the feature for training to zero and performing a (3_2)-nd fully-connected operation thereon, for k times in parallel, to thereby output the (2_1)-st to the (2_k)-th class scores for training, and thus (iii) output the second class score for training and its corresponding second uncertainty score for training by referring to at least part of the (2_1)-st to the (2_k)-th class scores for training.

4. The method of claim 1, wherein, at the step of (c), in the process of training the fitness estimation module through back-propagation by using the cross-entropy loss corresponding to the third loss, the learning device performs a process of clipping the cross-entropy loss to have a value ranging from 0 to 1 if the cross-entropy loss has a value lying outside the range of 0 to 1, and thus training the fitness estimation module through back-propagation by using a clipped cross-entropy loss.

5. The method of claim 1, wherein, at the step of (c), in the process of training the fitness estimation module through back-propagation by using the cross-entropy loss corresponding to the third loss, the learning device performs a process of training the fitness estimation module such that the fitness value for training is inversely proportional to a difference between the first uncertainty score for training and the second uncertainty score for training.

6. A method for performing auto-labeling, comprising steps of:

(a) on condition that a learning device, when a training image is acquired, has performed processes of (i) inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image, (ii) (ii-1) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii-2) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (ii-3) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (ii-4) allowing the auto-labeling device to apply a scale parameter to the second uncertainty score for training and thus to generate a scaled second uncertainty score for training, and (iii) (iii-1) generating a first loss by referring to the first class score for training and ground truth corresponding to the training image, to thereby train at least part of the first classification module and the feature extraction module through back-propagation by using the first loss, (iii-2) generating a second loss by referring to the second class score for training and the ground truth corresponding to the training image, to thereby train at least part of the second classification module and the feature extraction module through back-propagation by using the second loss, (iii-3) generating a third loss by referring to the first uncertainty score for training and the second uncertainty score for training, to thereby update the scale parameter, and (iii-4) training the fitness estimation module through back-propagation by using a cross-entropy loss corresponding to the third loss, an auto-labeling device, when an unlabeled image is acquired, performing processes of (a1) inputting the unlabeled image to the feature extraction module, to thereby allow the feature extraction module to perform at least one convolutional operation on the unlabeled image and thus to generate at least one feature corresponding to the unlabeled image, and (a2) inputting the feature to the fitness estimation module, to thereby allow the fitness estimation module to perform the first fully-connected operation and the sigmoid operation on the feature and thus to output a fitness value, which is a value ranging from 0 to 1 predicting a difference between an uncertainty score corresponding to output information generated from a first classification module on the unlabeled image and an uncertainty score corresponding to output information generated from a second classification module on the unlabeled image;

(b) the auto-labeling device, when the fitness value is acquired, performing processes of (b1) inputting the feature to the first classification module if the fitness value is larger than a predetermined threshold value, to thereby allow the first classification module to perform the second fully-connected operation and the probability distribution function (PDF) operation on the feature and thus to output a first class score corresponding to the unlabeled image and its corresponding first uncertainty score, and (b2) inputting the feature to the second classification module if the fitness value is smaller than or equal to the predetermined threshold value, to thereby allow the second classification module to perform the set of operations including randomly setting at least one element of the feature to zero and performing the third fully-connected operation thereon, for k times in parallel, thus to output a (2_1)-st to a (2_k)-th class scores, and thus to output a second class score and its corresponding second uncertainty score by referring to at least part of the (2_1)-st to the (2_k)-th class scores, after which a scale parameter is applied to the second uncertainty score to generate a scaled second uncertainty score; and (c) the auto-labeling device performing a process of generating a labeled image by labeling first class information corresponding to the first class score or second class information corresponding to the second class score, and transmitting a specific labeled image, which is generated by combining (i) a first label corresponding to first class information of the first uncertainty score exceeding a preset uncertainty score or a second label corresponding to second class information of the second uncertainty score exceeding the preset uncertainty score with (ii) the unlabeled image, to human experts, to thereby allow the human experts to verify the specific labeled image.

7. The method of claim 6, wherein, at the step of (b), in the process of inputting the feature to the first classification module, to thereby allow the first classification module to perform the second fully-connected operation and the probability distribution function (PDF) operation on the feature and thus to output the first class score corresponding to the unlabeled image and its corresponding first uncertainty score, the auto-labeling device performs a process of allowing the first classification module to (i) perform the second fully-connected operation and a rectifier operation on the feature, to generate a first intermediary output, and (ii) perform the PDF operation on the first intermediary output, to generate the first class score and its corresponding first uncertainty score.

8. The method of claim 6, wherein, at the step of (b), in the process of inputting the feature to the second classification module, to thereby allow the second classification module to perform a set of operations including randomly setting at least one element of the feature to zero and performing the third fully-connected operation thereon, for k times in parallel, thus to output the (2_1)-st to the (2_k)-th class scores, and thus to output the second class score and its corresponding second uncertainty score by referring to at least part of the (2_1)-st to the (2_k)-th class scores, the auto-labeling device performs a process of allowing the second classification module to (i) generate a second intermediary output by performing a (3_1)-st fully-connected operation on the feature, (ii) perform a set of operations including randomly setting at least one element of the feature to zero and performing a (3_2)-nd fully-connected operation thereon, for k times in parallel, to thereby output the (2_1)-st to the (2_k)-th class scores, and thus (iii) output the second class score and its corresponding second uncertainty score by referring to at least part of the (2_1)-st to the (2_k)-th class scores.

9. The method of claim 6, wherein, at the step of (c), the auto-labeling device performs a process of generating a fourth loss by referring to a verified labeled image which is verified by the human experts, and to the specific labeled image, to thereby (i) train the first classification module and the feature extraction module by using back-propagation with the fourth loss if the first uncertainty score exceeds the preset uncertainty score, and (ii) train the second classification module and the feature extraction module by using back-propagation with the fourth loss if the second uncertainty score exceeds the preset uncertainty score.

10. A learning device for training an auto-labeling device, comprising:
at least one memory that stores instructions; and
at least one processor configured to execute the instructions to perform or support another device to perform:
(I) when a training image is acquired, a process of inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image; (II) processes of (i) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (iii) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (iv) allowing the auto-labeling device to apply a scale parameter to the second uncertainty score for training and thus to generate a scaled second uncertainty score for training; and (III) processes of (i) generating a first loss by referring to the first class score for training and ground truth corresponding to the training image, to thereby train at least part of the first classification module and the feature extraction module through back-propagation by using the first loss, (ii) generating a second loss by referring to the second class score for training and the ground truth corresponding to the training image, to thereby train at least part of the second classification module and the feature extraction module through back-propagation by using the second loss, (iii) generating a third loss by referring to the first uncertainty score for training and the scaled second uncertainty score for training, to thereby update the scale parameter, and (iv) training the fitness estimation module through back-propagation by using a cross-entropy loss corresponding to the third loss.

11. The learning device of claim 10, wherein, at the step of (II), in the process of inputting the feature for training to the first classification module in the auto-labeling device, or allowing the auto-labeling device to input the feature for training to the first classification module, to thereby instruct the first classification module to perform the second fully-connected operation and the probability distribution function (PDF) operation on the feature for training and thus to output the first class score for training corresponding to the training image and its corresponding first uncertainty score for training, the processor performs a process of allowing the first classification module to (i) perform the second fully-connected operation and a rectifier operation on the feature for training, to generate a first intermediary output for training, and (ii) perform the PDF operation on the first intermediary output, to generate the first class score for training and its corresponding first uncertainty score for training.

12. The learning device of claim 10, wherein, at the step of (II), in the process of inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing the third fully-connected operation thereon, for k times in parallel, thus to output the (2_1)-st to the (2_k)-th class scores for training, and thus to output the second class score for training and its corresponding second uncertainty score for training by referring to at least part of the (2_1)-st to the (2_k)-th class scores for training, the processor performs a process of allowing the second classification module to (i) generate a second intermediary output for training by performing a (3_1)-st fully-connected operation on the feature for training, (ii) perform a set of operations including randomly setting at least one element of the feature for training to zero and performing a (3_2)-nd fully-connected operation thereon, for k times in parallel, to thereby output the (2_1)-st to the (2_k)-th class scores for training, and thus (iii) output the second class score for training and its corresponding second uncertainty score for training by referring to at least part of the (2_1)-st to the (2_k)-th class scores for training.

13. The learning device of claim 10, wherein, at the step of (III), in the process of training the fitness estimation module through back-propagation by using the cross-entropy loss corresponding to the third loss, the processor performs a process of clipping the cross-entropy loss to have a value ranging from 0 to 1 if the cross-entropy loss has a value lying outside the range of 0 to 1, and thus training the fitness estimation module through back-propagation by using a clipped cross-entropy loss.

14. The learning device of claim 10, wherein, at the step of (III), in the process of training the fitness estimation module through back-propagation by using the cross-entropy loss corresponding to the third loss, the processor performs a process of training the fitness estimation module such that the fitness value for training is inversely proportional to a difference between the first uncertainty score for training and the second uncertainty score for training.

15. An auto-labeling device for performing auto-labeling, comprising:
at least one memory that stores instructions; and
at least one processor configured to execute the instructions to perform or support another device to perform:
(I) on condition that a learning device, when a training image is acquired, has performed processes of (i) inputting the training image to a feature extraction module in the auto-labeling device, or allowing the auto-labeling device to input the training image to the feature extraction module, to thereby instruct the feature extraction module to perform at least one convolutional operation on the training image and thus to generate at least one feature for training corresponding to the training image, (ii) (ii-1) inputting the feature for training to a fitness estimation module in the auto-labeling device, or allowing the auto-labeling device to input the feature for training to the fitness estimation module, to thereby instruct the fitness estimation module to perform a first fully-connected operation and a sigmoid operation on the feature for training and thus to output a fitness value for training, which is a value ranging from 0 to 1 predicting a difference between an uncertainty score for training corresponding to output information generated from a first classification module on the training image and an uncertainty score for training corresponding to output information generated from a second classification module on the training image, (ii-2) inputting the feature for training to the first classification module in the auto-labeling device, or allowing the auto-labeling device to input the feature for training to the first classification module, to thereby instruct the first classification module to perform a second fully-connected operation and a probability distribution function (PDF) operation on the feature for training and thus to output a first class score for training corresponding to the training image and its corresponding first uncertainty score for training, (ii-3) inputting the feature for training to the second classification module in the auto-labeling device, or allowing the auto-labeling device to input the feature for training to the second classification module, to thereby instruct the second classification module to perform a set of operations including randomly setting at least one element of the feature for training to zero and performing a third fully-connected operation thereon, for k times in parallel, thus to output a (2_1)-st to a (2_k)-th class scores for training, and thus to output a second class score for training and its corresponding second uncertainty score for training by referring to at least part of the (2_1)-st to the (2_k)-th class scores for training, and (ii-4) allowing the auto-labeling device to apply a scale parameter to the second uncertainty score for training and thus to generate a scaled second uncertainty score for training, and (iii) (iii-1) generating a first loss by referring to the first class score for training and ground truth corresponding to the training image, to thereby train at least part of the first classification module and the feature extraction module through back-propagation by using the first loss, (iii-2) generating a second loss by referring to the second class score for training and the ground truth corresponding to the training image, to thereby train at least part of the second classification module and the feature extraction module through back-propagation by using the second loss, (iii-3) generating a third loss by referring to the first uncertainty score for training and the second uncertainty score for training, to thereby update the scale parameter, and (iii-4) training the fitness estimation module through back-propagation by using a cross-entropy loss corresponding to the third loss, when an unlabeled image is acquired, processes of (I-1) inputting the unlabeled image to the feature extraction module, to thereby allow the feature extraction module to perform at least one convolutional operation on the unlabeled image and thus to generate at least one feature corresponding to the unlabeled image, and (I-2) inputting the feature to the fitness estimation module, to thereby allow the fitness estimation module to perform the first fully-connected operation and the sigmoid operation on the feature and thus to output a fitness value, which is a value ranging from 0 to 1 predicting a difference between an uncertainty score corresponding to output information generated from a first classification module on the unlabeled image and an uncertainty score corresponding to output information generated from a second classification module on the unlabeled image; (II) when the fitness value is acquired, processes of (II-1) inputting the feature to the first classification module if the fitness value is larger than a predetermined threshold value, to thereby allow the first classification module to perform the second fully-connected operation and the probability distribution function (PDF) operation on the feature and thus to output a first class score corresponding to the unlabeled image and its corresponding first uncertainty score, and (II-2) inputting the feature to the second classification module if the fitness value is smaller than or equal to the predetermined threshold value, to thereby allow the second classification module to perform the set of operations including randomly setting at least one element of the feature to zero and performing the third fully-connected operation thereon, for k times in parallel, thus to output a (2_1)-st to a (2_k)-th class scores, and thus to output a second class score and its corresponding second uncertainty score by referring to at least part of the (2_1)-st to the (2_k)-th class scores, after which a scale parameter is applied to the second uncertainty score to generate a scaled second uncertainty score; and (III) a process of generating a labeled image by labeling first class information corresponding to the first class score or second class information corresponding to the second class score, and transmitting a specific labeled image, which is generated by combining (i) a first label corresponding to first class information of the first uncertainty score exceeding a preset uncertainty score or a second label corresponding to second class information of the second uncertainty score exceeding the preset uncertainty score with (ii) the unlabeled image, to human experts, to thereby allow the human experts to verify the specific labeled image.

16. The auto-labeling device of claim 15, wherein, at the step of (II), in the process of inputting the feature to the first classification module, to thereby allow the first classification module to perform the second fully-connected operation and the probability distribution function (PDF) operation on the feature and thus to output the first class score corresponding to the unlabeled image and its corresponding first uncertainty score, the processor performs a process of allowing the first classification module to (i) perform the second fully-connected operation and a rectifier operation on the feature, to generate a first intermediary output, and (ii) perform the PDF operation on the first intermediary output, to generate the first class score and its corresponding first uncertainty score.

17. The auto-labeling device of claim 15, wherein, at the step of (II), in the process of inputting the feature to the second classification module, to thereby allow the second classification module to perform a set of operations including randomly setting at least one element of the feature to zero and performing the third fully-connected operation thereon, for k times in parallel, thus to output the (2_1)-st to the (2_k)-th class scores, and thus to output the second class score and its corresponding second uncertainty score by referring to at least part of the (2_1)-st to the (2_k)-th class scores, the processor performs a process of allowing the second classification module to (i) generate a second intermediary output by performing a (3_1)-st fully-connected operation on the feature, (ii) perform a set of operations including randomly setting at least one element of the feature to zero and performing a (3_2)-nd fully-connected operation thereon, for k times in parallel, to thereby output the (2_1)-st to the (2_k)-th class scores, and thus (iii) output the second class score and its corresponding second uncertainty score by referring to at least part of the (2_1)-st to the (2_k)-th class scores.

18. The auto-labeling device of claim 15, wherein, at the step of (III), the processor performs a process of generating a fourth loss by referring to a verified labeled image which is verified by the human experts, and to the specific labeled image, to thereby (i) train the first classification module and the feature extraction module by using back-propagation with the fourth loss if the first uncertainty score exceeds the preset uncertainty score, and (ii) train the second classification module and the feature extraction module by using back-propagation with the fourth loss if the second uncertainty score exceeds the preset uncertainty score.

* * * * *